United States Patent
Krompack

(10) Patent No.: US 8,262,440 B2
(45) Date of Patent: Sep. 11, 2012

(54) CONCRETE POLISHING EXTENSION

(76) Inventor: Brian James Krompack, Fishers, IN (US)

(*) Notice: Subject to any disclaimer, the term of this patent is extended or adjusted under 35 U.S.C. 154(b) by 911 days.

(21) Appl. No.: 12/321,020

(22) Filed: Jan. 15, 2009

(65) Prior Publication Data

US 2009/0181603 A1    Jul. 16, 2009

Related U.S. Application Data

(60) Provisional application No. 61/011,263, filed on Jan. 16, 2008.

(51) Int. Cl.
*B24B 55/02* (2006.01)

(52) U.S. Cl. ............ 451/359; 125/20; 451/450

(58) Field of Classification Search ............ 451/359, 451/450; 125/20, 36, 1
See application file for complete search history.

(56) References Cited

U.S. PATENT DOCUMENTS

| 3,583,383 A * | 6/1971 | Ovshinsky ............ 125/20 |
| 5,221,156 A | 6/1993 | Martin |
| 6,139,217 A | 10/2000 | Rueter |
| 6,976,909 B1 * | 12/2005 | Hoover ............ 451/354 |
| 7,104,725 B1 | 9/2006 | Kipp et al. |

* cited by examiner

*Primary Examiner* — Robert Rose
(74) *Attorney, Agent, or Firm* — Ritchison Law Office, PC; John D Ritchison

(57) ABSTRACT

A Concrete Polishing Extension device for treating hardened concrete surfaces and more specifically interior surfaces of countertop sinks made from decorative concrete. The extension device has features for use with grinding deep, contoured surfaces of concrete. The preferred embodiment is comprised of an extended shaft with connection features and other features; a containment cap; a means to connect cap to shaft; an external sleeve that encircles the shaft; a slip ring collar; a means to connect external sleeve to slip ring collar; a bearing such as a thrust bearing; means to connect slip ring collar to bearing; and a means of the extended shaft used to contain bearing, slip ring collar and sleeve assembly. The device has a distal end with means to removably attach to a standard driver and a proximal end with means to removably attach to engage a standard grinding head.

16 Claims, 4 Drawing Sheets

CONCRETE POLISHING EXTENSION

CROSS-REFERENCE TO RELATED APPLICATIONS

This application claims the benefit of Provisional Patent Application Ser. No. 61/011,263 filed Jan. 16, 2008 by Brian James Krompack and entitled Concrete Polishing Extension and called Da' Shaft.

FIELD OF INVENTION

The present invention relates generally to a device for polishing or grinding hardened concrete surfaces and more specifically to interior surfaces of countertop lavatory bowls or kitchen sinks made from decorative concrete. This extension device has a new and unique feature to add existing grinders for use with deep, contoured surfaces of concrete. The preferred and alternative embodiments are described below.

FEDERALLY SPONSORED RESEARCH

Not Applicable.

SEQUENCE LISTING OR PROGRAM

Not Applicable.

BACKGROUND

Field of Invention and Prior Art

A. Introduction of the Problems Addressed

Flat surface concrete grinders and polishers are well known in the art. They are limited to flat surface finishing however by the location of the grinding or polishing abrasive carrying head and standard length drive shaft. The shaft is typically in line with or at right angles to the drive unit and handle. The result of these design limitations is that they are inadequate for polishing the interior surfaces of lavatory bowls or sinks that therefore must be ground and polished by hand. This hand work requires hours of effort to attain the polish level required for such decorative concrete countertop units. It is believed that this extension device for polishing concrete is made with improved configurations and physical features to provide more functionality when compared to other currently utilized grinding and polishing tools.

B. Prior Art

The historical technology focused mainly on the location of the grinding or polishing abrasive carrying head and standard length drive shaft, typically in line with or at right angles to the drive unit and handle. Examples of prior grinder and finishing devices for concrete include U.S. Pat. No. 5,221,156 issued to Martin (1993) and entitled "Concrete finishing machine". This device was a power unit base that supports a power unit which has a power drive extending through a circular spacing member plate mounted above a concrete finishing plate on which are all attached concrete finishing members. Spaced handles extend above the finishing plate and provide hand gripping surfaces whereby the unit can be operated while the operator stands above the machine. Control means for the power unit is mounted on one of the handles. This did not teach small hand held device similar to the Concrete Polishing Extension for use with decorative concrete countertop units.

A further example of a grinder device is shown in U.S. Pat. No. 6,139,217 (2000) by Reuter and entitled "concrete finishing tool". It taught a concrete finishing tool comprising an elongated handle in a cylindrical configuration having an upper portion and a lower portion and an intermediate portion there between, the upper surface also including a pair of vibrators adjacent to the lateral ends thereof.

A final and more recent example of a grinder device is shown by Kipp et al in U.S. Pat. No. 7,104,725 (2006) and entitled "Concrete finishing attachment". This taught a concrete finishing attachment for final finishing or troweling of concrete using a portable hand power tool, such as an angle grinder, comprised of a central hub formed into a frustrum shape with a hole located centrally for registration with the spindle or arbor of the tool, and having a plurality of vanes, preferably four, disposed radially around the perimeter of the hub. Each vane has a leading stabilizer, followed by an inclined tab orientated obliquely downward relative to the stabilizer, followed by a finishing blade oriented obliquely upward relative to the inclined tab, but still obliquely downward at a slight angle. Each vane engages with the hub along the inner edge of the arc sector formed by the stabilizer. The concrete finishing attachment is used by registering the spindle of the power tool with the hole in the hub and securing with a nut or other means. This does not lend itself to curved surfaces in the bowls of decorative concrete countertop units.

As far as known, there is no other concrete polishing extension device at the present time which fully provides these improvements and functional characteristics as the present device known as Da' Shaft. It is believed that this device is made with physical features to provide more unique functionality when compared to other currently utilized grinding and polishing devices. As discussed, the particular combinations of materials and features are unique and novel and are not anticipated by prior art. Likewise, use of Da' Shaft provides significant benefits compared to prior art devices.

SUMMARY OF THE INVENTION

A Concrete Polishing Extension has been developed and designed to provide a unique feature and combination that is specifically related to finishing decorative concrete countertop units. The Concrete Polishing Extension may be used with finishing treatments such as grinding and polishing as discussed below. The device is made of high quality materials.

The preferred embodiment of the Concrete Polishing Extension is made of durable materials and is comprised of an extended shaft with connection features and other features; a containment cap; a means to connect cap to shaft; an external sleeve that loosely encircles the shaft; a slip ring collar with an inner and outer diameter; a means to connect external sleeve to slip ring collar said means for example by epoxy adhesive or friction welding or the like; a bearing such as a thrust bearing; means to connect slip ring collar to bearing such as by a press fit of the inner diameter of the collar to the outer diameter of the bearing; and a means or feature such as a shoulder or the like, said means such as a shoulder of the extended shaft primarily used to contain bearing, slip ring collar and sleeve assembly. A distal end of the shaft of the Concrete Polishing Extension has a means to removably attach—such as a threaded hole—in order to engage a standard grinder with the device. A proximal end of the shaft of the Concrete Polishing Extension has a means to removably attach—such as a threaded male shaft or the like—in order to engage a standard polishing/grinding rotary head assembly with the Concrete Polishing Extension. The proximal end has other features such as opposing flats for use in torqueing the Concrete Polishing Extension to the standard polishing/grinding rotary head assembly. Finally, Concrete Polishing Extension has a bore approximately a 3/16 inch bore though the center to allow cooling water to be passed through from grinder to polishing head.

OBJECTS AND ADVANTAGES

There are several objects and advantages of the Concrete Polishing Extension device known as Da' Shaft. There are currently no known devices that are effective at providing the objects of this invention. One objective of the Concrete Polishing Extension is to allow the abrasive rotary polishing head to be extended down into the bottom of a bowl cavity. A second objective is to supply cooling liquid to the diamond impregnated polishing surface.

Noteworthy to one is that other advantages and additional features of the present Concrete Polishing Extension will be more apparent from the accompanying drawings and from the full description of the device. For one skilled in the art of grinding and polishing, it is readily understood that the features shown in the examples with this device are readily adapted for improvement to other types of grinding and polishing devices.

DESCRIPTION OF THE DRAWINGS—FIGURES

The accompanying drawings, which are incorporated in and constitute a part of this specification, illustrate a preferred and alternative embodiments for the Concrete Polishing Extension. The drawings together with the summary description given above and a detailed description given below serve to explain the principles of the Concrete Polishing Extension It is understood, however, that the device is not limited to only the precise arrangements and instrumentalities shown.

DESCRIPTION OF THE DRAWINGS—REFERENCE NUMERALS

Figure 1:
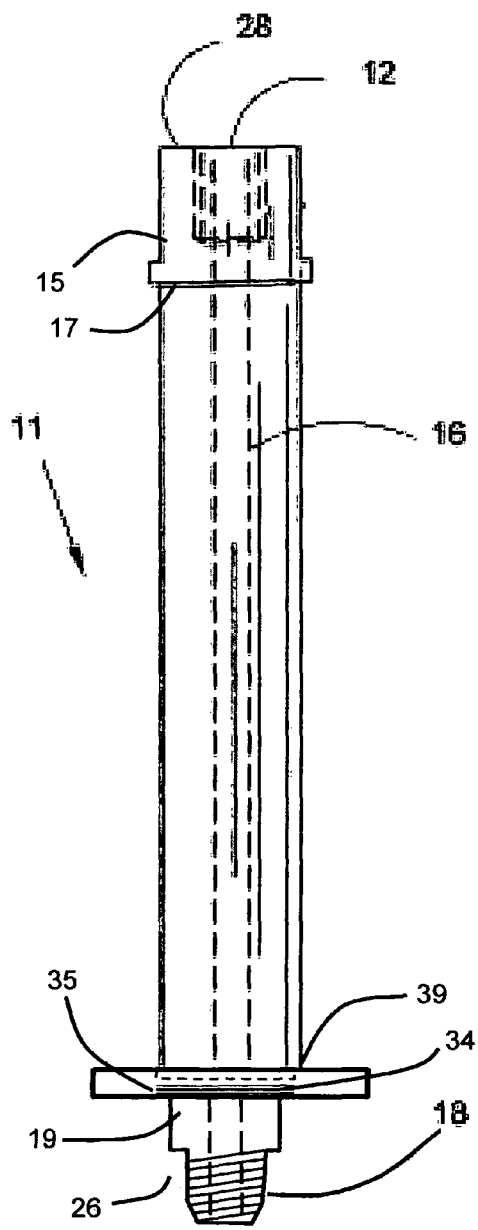
FIG. 1 is a side view of the Concrete Polishing Extension.

The following list refers to the drawings:

| ITEM | DESCRIPTION |
| --- | --- |
| 11 | general Concrete Polishing Extension |
| 12 | threaded hole/aperture for attachment to standard grinder |
| 13 | means to removably attach |
| 14 | flats for torqueing extension to a standard polishing/grinding |

-continued

| ITEM | DESCRIPTION |
| --- | --- |
|  | rotary head assembly |
| 15 | containment cap |
| 16 | cooling water pass through bore |
| 17 | means to secure cap 15 to extended shaft 18 |
| 18 | extension shaft with features for attachment to driver and treatment head |
| 19 | Means to contain slip ring such as a shoulder on the shaft 18 |
| 20 | driver such as a grinder |
| 22 | standard treatment rotary head assembly such as for polishing/grinding |
| 24 | concrete counter top with bowl |
| 26 | proximal end (with attachment means 13 to standard polishing/grinding rotary head assembly 22) |
| 28 | distal end (with attachment means 13 to driver 20) |
| 30 | slip ring collar |
| 32 | support handle |
| 34 | bearing(s) - such as a thrust or ball bearing |
| 35 | means to connect slip ring collar 30 to bearing 34 |
| 36 | anti rotation anchor tab (optional) |
| 38 | sleeve |
| 39 | means to connect extended shaft 18 to slip ring collar 30 such as a press fit, epoxy or friction weld |

DETAILED DESCRIPTION OF PERFERRED EMBODIMENT

The preferred embodiment of the Concrete Polishing Extension 11 is made of durable materials and is comprised of an extended shaft 18 with connection features and other features; a containment cap 17; a means to connect cap 17 to shaft 18; an external sleeve 38 that encircles the shaft 18; a slip ring collar 30; a means to connect 39 external sleeve 38 to slip ring collar 30; a bearing 34; means to connect slip ring collar 30 to bearing 34; and a means or feature such as a shoulder 19 or the like, said means 19 of the extended shaft 18 primarily used to contain bearing 34, slip ring collar 30 and sleeve 38 assembly.

Figure 2:
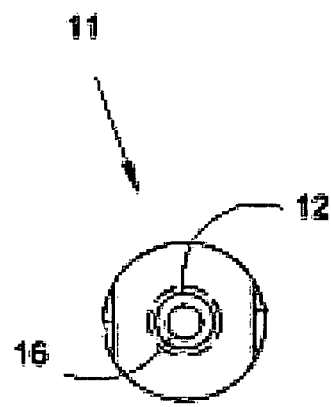
FIG. 2 is a top end view of same.
Figure 3:
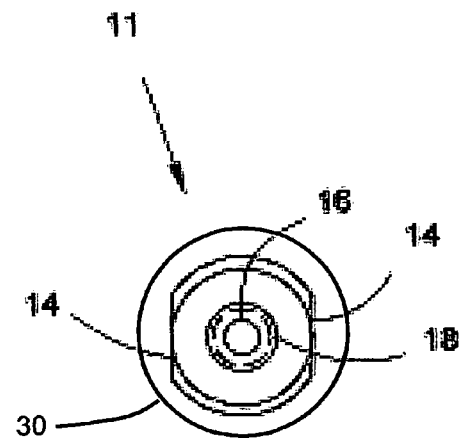
FIG. 3 is a bottom end view of same.
Figure 4:
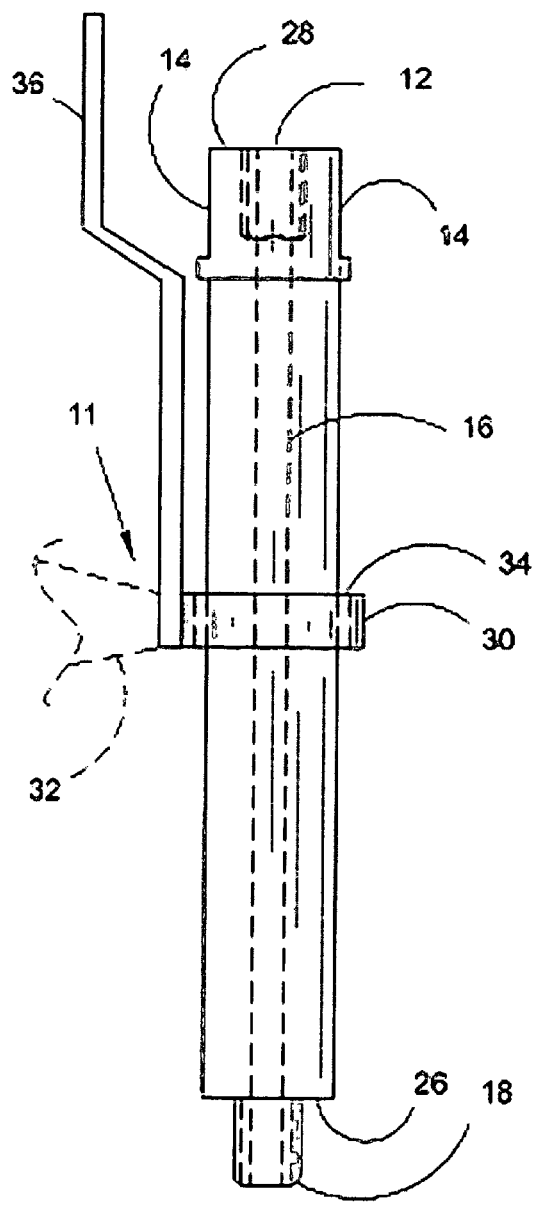
FIG. 4 is a side view of the Concrete Polishing Extension with a handle supporting collar with bearing and anti-rotation anchor tab.
Figure 5:
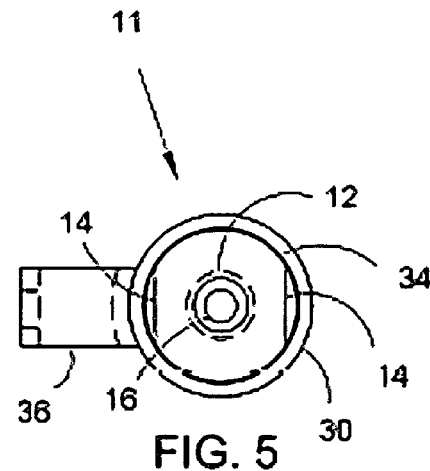
FIG. 5 is a top end view of same.
Figure 6:
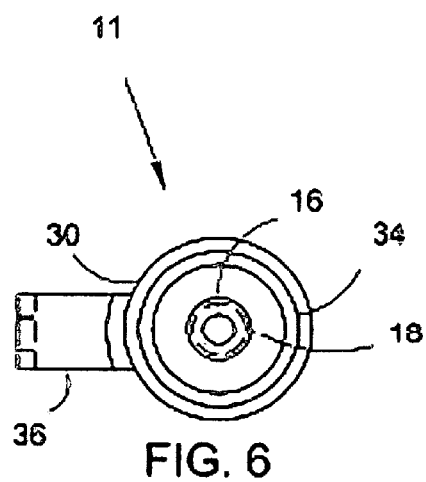
FIG. 6 is a bottom end view of same.
Figure 7:
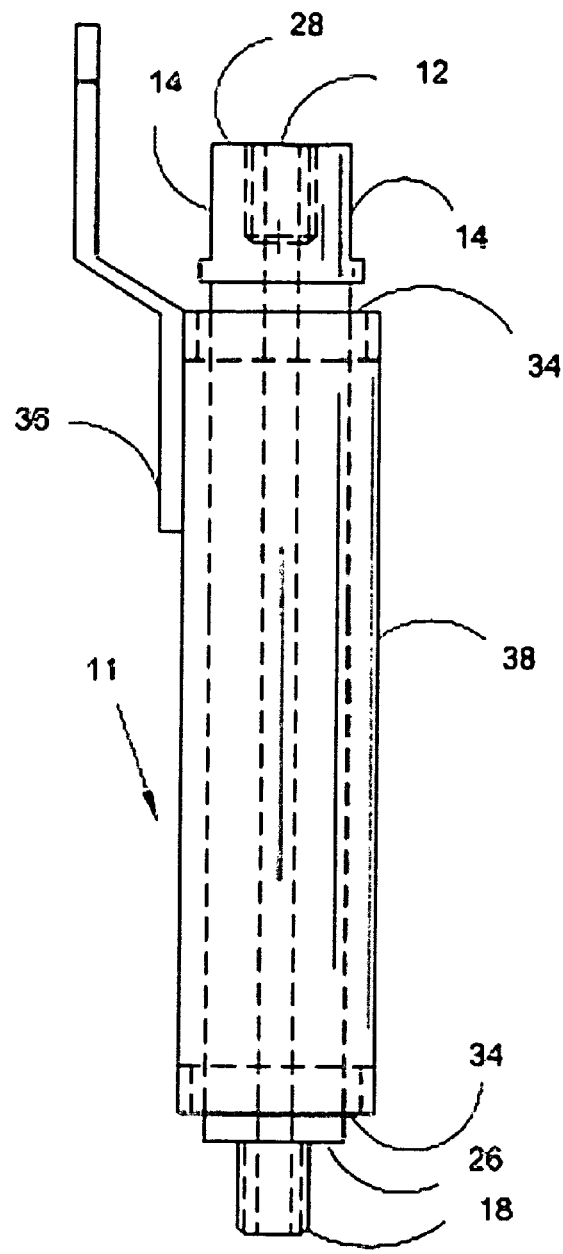
FIG. 7 is a side view of the Concrete Polishing Extension with a sleeve with bearings at both ends and anti-rotation anchor tab.
Figure 8:
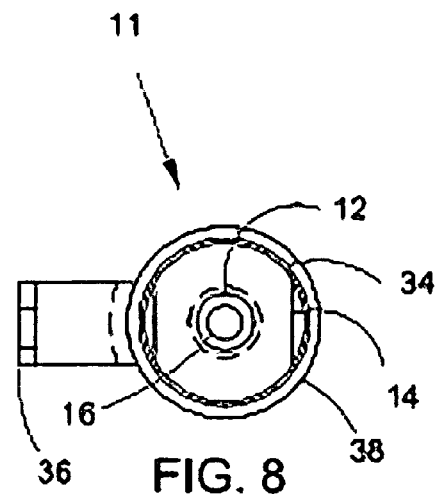
FIG. 8 is a top end view of same.
Figure 9:
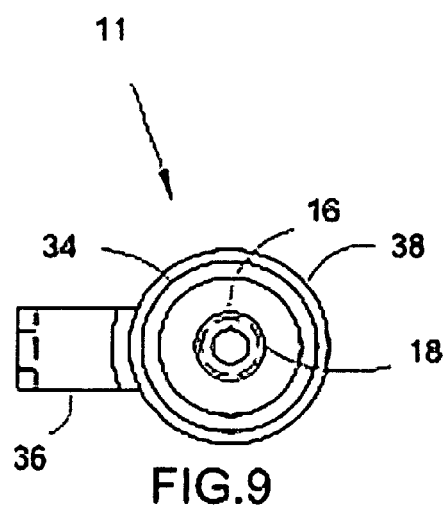
FIG. 9 is a bottom end view of same.

In order that the invention is fully understood it will now be described by way of the following examples in which Concrete Polishing Extension 11 is shown. These are exemplary and not limiting embodiments as one skilled in the art of grinding and polishing devices well appreciates. In FIGS. 1, 2 and 3 the preferred embodiment is shown. An alternative embodiment with a handle support collar with bearings and anti-rotational anchor tab is shown in FIGS. 4, 5 and 6. Another alternative embodiment with an outer sleeve with bearings and an anti-rotational anchor tab in FIGS. 7, 8 and 9.

Concrete Polishing Extension 11 is designed for ease of assembly and can be readily changed out with longer or shorter extensions as the job requires. To this end Concrete Polishing Extension 11 as the preferred embodiment is essentially a straight assembly approximately 2 to 8 inches in length and approximately 7/8 inches in diameter. The device 11 is preferably fabricated from aluminum although other durable materials such as metals and composite materials can be used for higher speed applications. The preferred embodiment of the Concrete Polishing Extension 11 is made of durable materials and is comprised of an extended shaft 18 with connection features and other features; a containment cap 17; a means to connect cap 17 to shaft 18; an external sleeve 38 that encircles the shaft 18; a slip ring collar 30 with an inner and outer diameter; a means to connect 39 external sleeve 38 to slip ring collar 30 said means for example by epoxy adhesive or friction welding or the like; a bearing 34 such as a thrust bearing; means to connect slip ring collar 30 to bearing 34 such as by a press fit of the inner diameter of the collar 30 to the outer diameter of the bearing 34; and a means or feature such as a shoulder 19 or the like, said means 19 such as a shoulder of the extended shaft 18 primarily used to contain bearing 34, slip ring collar 30 and sleeve 38 assembly. A distal end 28 of the shaft 18 of the Concrete Polishing Extension 11 has a means to removably attach 13—such as a threaded hole 12—in order to engage a standard driver 20 such as a grinder with the device 11. A proximal end 26 of the shaft 18 of the Concrete Polishing Extension 11 has a means to removably attach 13—such as a threaded male end or the like—in order to engage a standard polishing/grinding rotary head assembly 22 with the Concrete Polishing Extension 11. The preferred thread gage is a standard ⅝-11 (inches outside diameter and threads per inch of length) as an example but other thread sizes and coarses are within the scope of the invention. The proximal end 26 has other features such as opposing flats 14 for use in torqueing the Concrete Polishing Extension 11 to the standard polishing/grinding rotary head assembly 22 respectively. Finally, Concrete Polishing Extension 11 has a bore 16 approximately a 3/16 inch bore though the center to allow cooling water to be passed through from grinder 20 to polishing head 22. One skilled in the art of tool devices well appreciates the sizes and dimensions stated are illustrative and not limiting. Similitude of the device allows for the art to be used in various sizes and dimensions and still be well within the spirit and scope of the invention. Likewise, one skilled in the art of grinding and polishing appreciates the coolant may be used for a wet finish for some operations and without lubricant for a dry finish if desired or recommended.

An alternative embodiment has slip ring collar 30 clamped toward distal end 28 to attach a support handle 32 as shown in FIGS. 4, 5 and 6. The support handle 32 is shown in dashed lines and is not part of this invention. A collar 30 is supported on bearing 34 and has and optional anti-rotational anchor tab 36 attached to collar 30 and has a slot for a mounting screw to attach it to grinder 20. This feature is to prevent the anchor tab 36 and handle 30 from spinning before the handle is grasped.

A second alternative embodiment has sleeve 38 supported on bearings 34 at each end. This feature allows an operator to simply grasp sleeve 38 and no additional handle is required. This alternative embodiment also discloses an optional anti-rotational anchor tab 36 attached to the outside of sleeve 38 and includes a screw mounting slot at its distal end for attaching to the housing of grinder 20.

Although this invention has been described by detailing several embodiments, it is not intended to be limited to this set of materials and dimensions. It will be recognized by one skilled in this art that various materials, assembly techniques and the relative scale can all be altered without stepping away from the scope of this invention which is only limited by the claims below.

Operation of the Preferred Embodiment

Figure 10:
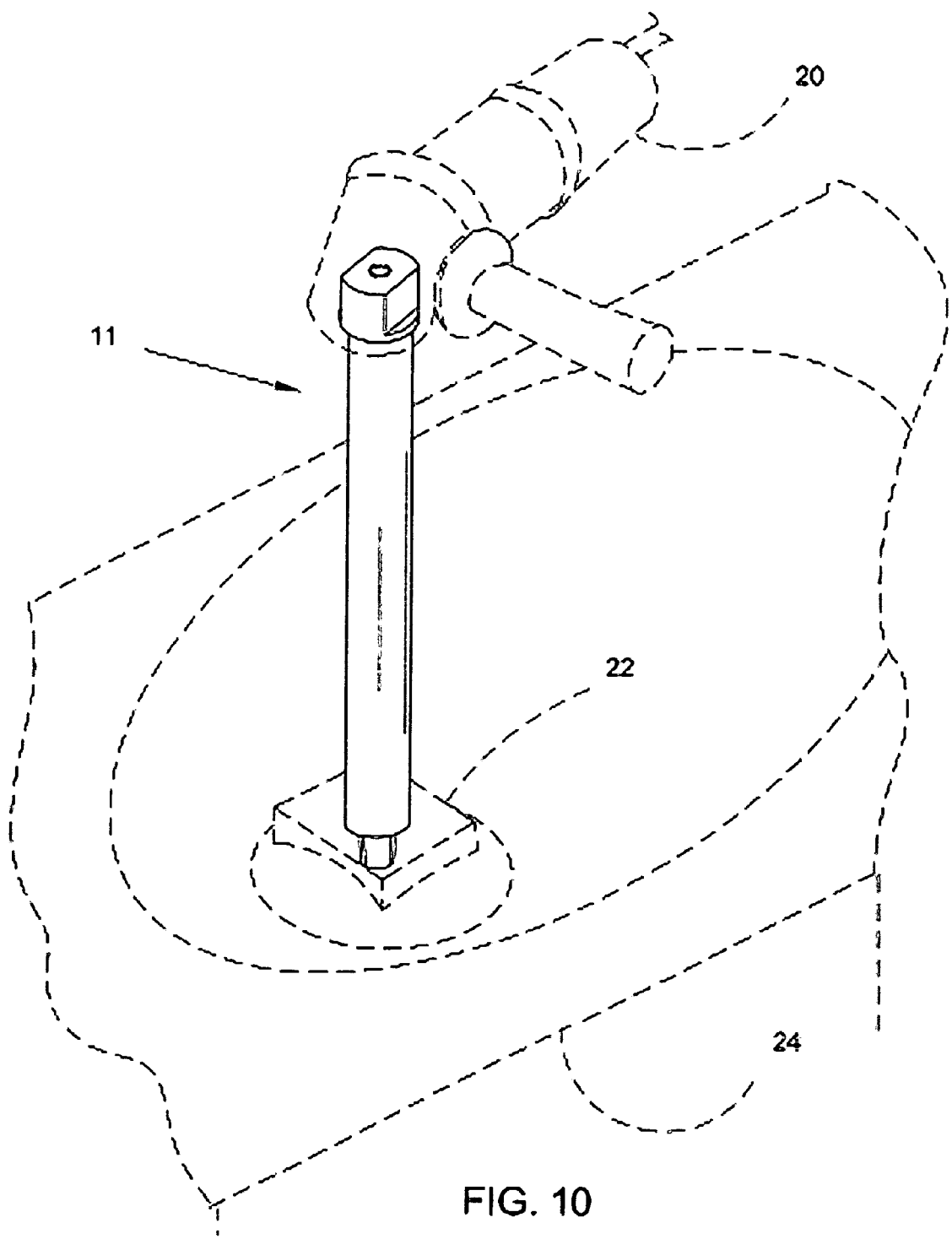
FIG. 10 is a perspective view of Concrete Polishing Extension mounted between a standard hand held grinder and a standard polishing rotary grinding head disposed in the interior of a counter top concrete bowl.

The preferred embodiment for the Concrete Polishing Extension 11 has been described in the above paragraphs. Concrete Polishing Extension 11 works with any standard hand held grinder 20, fitting between grinder's 20 drive shaft and standard polishing/grinding rotary head assembly 22. A representative Grinder 20, Polishing head 22 and concrete counter top with bowl 24 are shown in FIG. 10 in phantom lines for illustration purposes, but are not parts of this invention. The manner of how the device operates is described below. One skilled in the art of grinders and polishers will note that the description above and the operation described here must be taken together to fully illustrate the concept of the Concrete Polishing Extension 11.

The preferred embodiment of the Concrete Polishing Extension 11 is comprised of a unique combination of components with features as described above. The device 11 is used by attaching the proximal end 26 to the standard polishing/grinding rotary head assembly 22. Then by attaching the distal end 28 to the grinder 20. The said treatment head assembly 22 may be of many types such as, yet not limited to, a grinding wheel, a felt buffing device, sand paper, diamond embedded polishing devices, leather and the like. Once attached, the driver 20 rotates the Concrete Polishing Extension 11 from the distal end. The proximal end 26 which is secured to the surface treatment head 22, so the head 22 rotates as the extension 11 rotates. The surface of the treatment head 22 is placed in contact with the surface of the work piece such as a concrete counter top 24. The resultant abrasion from the head 22 removes or polishes the work piece surface to the desired surface contour and finish.

With the above description it is to be understood that the Concrete Polishing Extension 11 is not to be limited to only the disclosed embodiment. The features of the Concrete Polishing Extension 11 are intended to cover various modifications and equivalent arrangements included within the spirit and scope of the description.

What is claimed is:

1. A Concrete Polishing Extension 11 is made of durable materials comprised of
   (a) an extended shaft 18 with a proximal end 26 and a distal end 28, each of the end 26, 28 with connection features;
   (b) a containment cap 17;
   (c) a means to connect cap 17 to shaft 18;
   (d) an external sleeve 38 that encircles the shaft 18 in a slip fit;
   (e) a slip ring collar 30 with an inner and outer diameter;
   (f) a means to connect 39 external sleeve 38 to slip ring collar 30;
   (g) a bearing 34;
   (h) means to connect slip ring collar 30 to bearing 34; and
   (i) a feature of the extended shaft 18 as a means to contain bearing 34, slip ring collar 30 and sleeve 38 assembly
   wherein the features of the concrete polishing extension 11 may be used to the extend the depth of a polishing head assembly 22 from a drive 20 to result in an extended reach and permit the extended reach to treat deep, contoured surfaces of concrete counter top with bowls.

2. The device according to claim 1 wherein the extended shaft 18 has a bore 16 though the center to allow cooling water to be passed through from grinder 20 to polishing head 22.

3. The device according to claim 1 wherein the connection feature of the distal end 28 of the shaft 18 of the Concrete Polishing Extension 11 is a means to removably attach 13 a standard drive 20 to the device 11.

4. The device according to claim 3 wherein the means to removably attach 13 is an internally threaded hole 12.

5. The device according to claim 1 wherein the connection feature of the proximal end 26 of the shaft 18 of the Concrete Polishing Extension 11 is a means to removably attach 13 a standard treatment rotary head assembly 22 with the Concrete Polishing Extension 11.

6. The device according to claim 5 wherein the means to removably attach 13 is an external male thread.

7. The device according to claim 1 wherein the proximal end 26 of the shaft 18 of the Concrete Polishing Extension 11 is additionally comprising a pair of opposing flats 14 for use in torqueing the Concrete Polishing Extension 11 to a standard treatment rotary head assembly 22.

8. The device according to claim 1 wherein the means to connect 39 external sleeve 38 to slip ring collar 30 is an epoxy adhesive.

9. The device according to claim 1 wherein the means to connect 39 external sleeve 38 to slip ring collar 30 is by friction welding.

10. The device according to claim 1 wherein the bearing 34 is a thrust bearing.

11. The device according to claim 1 wherein the means to connect slip ring collar 30 to bearing 34 is a press fit of the inner diameter of the collar 30 to the outer diameter of the bearing 34.

12. The device according to claim 1 wherein the feature is a shoulder 19 of the extended shaft 18 primarily used to contain bearing 34, slip ring collar 30 and sleeve 38.

13. A Concrete Polishing Extension 11 is made of durable materials comprised of
   (a) an extended shaft 18 with a proximal end 26 and a distal end 28, each of the end 26, 28 with connection features;
   (b) a containment cap 17;
   (c) a means to connect cap 17 to shaft 18;
   (d) an external sleeve 38 that encircles the shaft 18 with a slip fit;
   (e) a slip ring collar 30 with an inner and outer diameter clamped toward distal end 28;
   (f) a support handle 32;
   (g) a means to attach support handle 32 to slip ring collar 30;
   (h) a means to connect 39 external sleeve 38 to slip ring collar 30;
   (i) a bearing 34;
   (j) means to connect slip ring collar 30 to bearing 34; and
   (k) a feature of the extended shaft 18 as a means to contain bearing 34, slip ring collar 30 and sleeve 38 assembly
   wherein the features of the concrete polishing extension 11 may be used to the extend the depth of a polishing head assembly 22 from a drive 20 to result in an extended reach and permit the extended reach to treat deep, contoured surfaces of concrete counter top with bowls.

14. The device according to claim 13 additionally comprising
   (l) an anti-rotational anchor tab 36 and
   (m) a means to attach tab 36 to slip ring collar 30.

15. A Concrete Polishing Extension 11 is made of durable materials comprised of
   (a) an extended shaft 18 with a proximal end 26 and a distal end 28, each of the end 26, 28 with connection features;
   (b) a containment cap 17;
   (c) a means to connect cap 17 to shaft 18;
   (d) an external sleeve 38 that encircles the shaft 18;
   (e) a slip ring collar 30 with an inner and outer diameter;
   (f) a means to connect 39 external sleeve 38 to slip ring collar 30;
   (g) a distal bearing 34;
   (h) a means to connect distal bearing 34 to the shaft 18;
   (i) a means to connect distal bearing 34 to the external sleeve 38;
   (j) a proximal bearing 34;
   (k) means to connect slip ring collar 30 to proximal bearing 34; and
   (l) a feature of the extended shaft 18 as a means to contain proximal bearing 34, slip ring collar 30 and sleeve 38 assembly
   wherein the features of the concrete polishing extension 11 may be used to the extend the depth of a polishing head assembly 22 from a drive 20 to result in an extended reach and permit the extended reach to treat deep, contoured surfaces of concrete counter top with bowls.

16. The device according to claim 15 additionally comprising
   (m) an anti-rotational anchor tab 36 and
   (n) a means to attach tab 36 to slip ring collar 30.

* * * * *